United States Patent

Grabowski

[11] Patent Number: 5,855,070
[45] Date of Patent: Jan. 5, 1999

[54] RECIPROCATING SAW WITH PIVOTED SHOE AND METHOD FOR ATTACHING SHOE

[75] Inventor: Benjamin J. Grabowski, Joppa, Md.

[73] Assignee: Black & Decker Inc., Newark, Del.

[21] Appl. No.: 870,678

[22] Filed: Jun. 6, 1997

[51] Int. Cl.$^6$ .................................................. B27B 11/02
[52] U.S. Cl. ................ 30/376; 30/392; 16/261
[58] Field of Search ............................. 30/374, 375, 376, 30/392; 16/261, 262

[56] References Cited

U.S. PATENT DOCUMENTS

| | | | |
|---|---|---|---|
| 1,035,524 | 8/1912 | Bradley | 30/376 |
| 2,998,830 | 9/1961 | Atkinson . | |
| 3,338,609 | 8/1967 | Banas | 16/262 |
| 3,375,544 | 4/1968 | Suska . | |
| 3,496,972 | 2/1970 | Rees | 30/376 |
| 4,765,025 | 8/1988 | Salazar | 16/261 |
| 5,007,172 | 4/1991 | Palm | 30/392 |
| 5,271,122 | 12/1993 | Roth et al. . | |

FOREIGN PATENT DOCUMENTS 0669181  8/1995  European Pat. Off. .

OTHER PUBLICATIONS

Ex. A, Photos 1–4, Milwaukee Electric Tools Inline Reciprocating Saw.

*Primary Examiner*—Hwei-Siu Payer
*Attorney, Agent, or Firm*—Dennis A. Dearing; John D. Del Ponti; Bruce S. Shapiro

[57] ABSTRACT

A reciprocating saw (11) comprises a support (27) attached to the body of the saw and a shoe (25) pivotally attached to the support (27). The pivoted shoe (25) enables the shoe (25) and thus the blade to engage a workpiece at varying angles during cutting. The shoe (25) is attached to the support (27) by a hinge. The hinge (12) comprises a spaced pair of tabs (29,31) extending from the support (27) and located between a spaced pair of tabs (45,47) extending from the shoe (25). Each of the support tabs is paired respectively with one of the shoe tabs. Pins (55,57) extends through apertures (33, 35,49,51) in the tabs (29,31,45,47) and forms the hinge pivot. The hinge pivot is maintained in place by spacers (59,61) located, respectively, between each pair of shoe and support tabs and press fitted to the pin. The press fitted hinge (12) is low in cost and is durable.

8 Claims, 2 Drawing Sheets

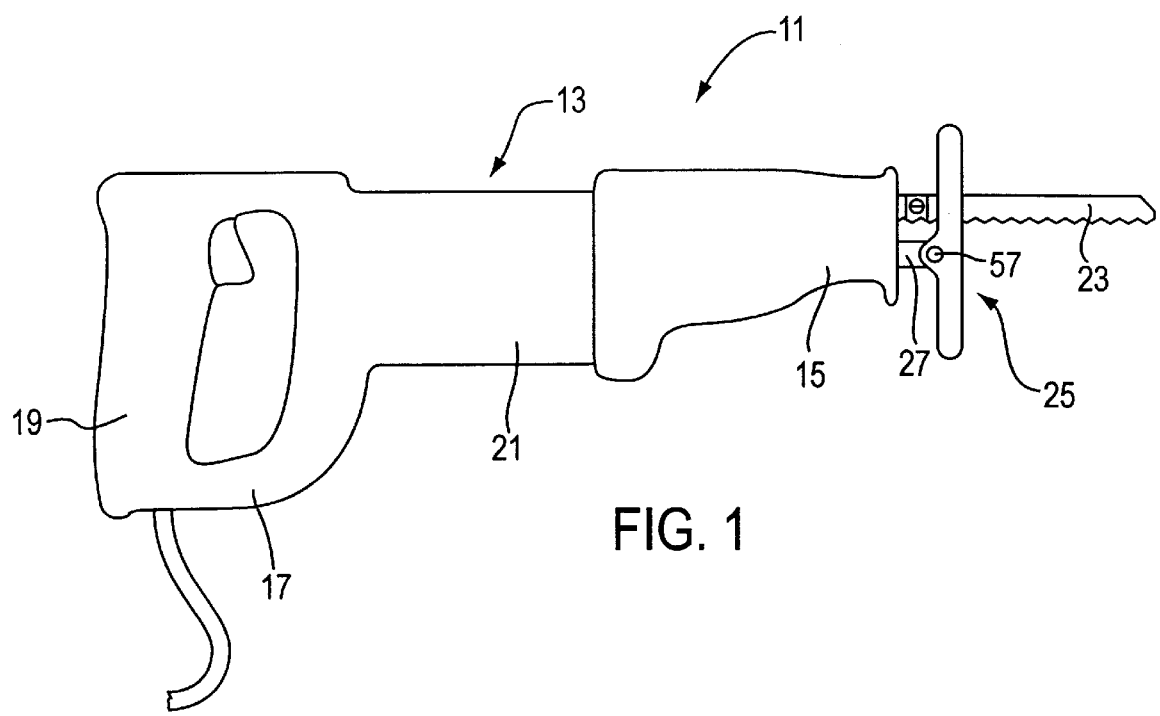
FIG. 1
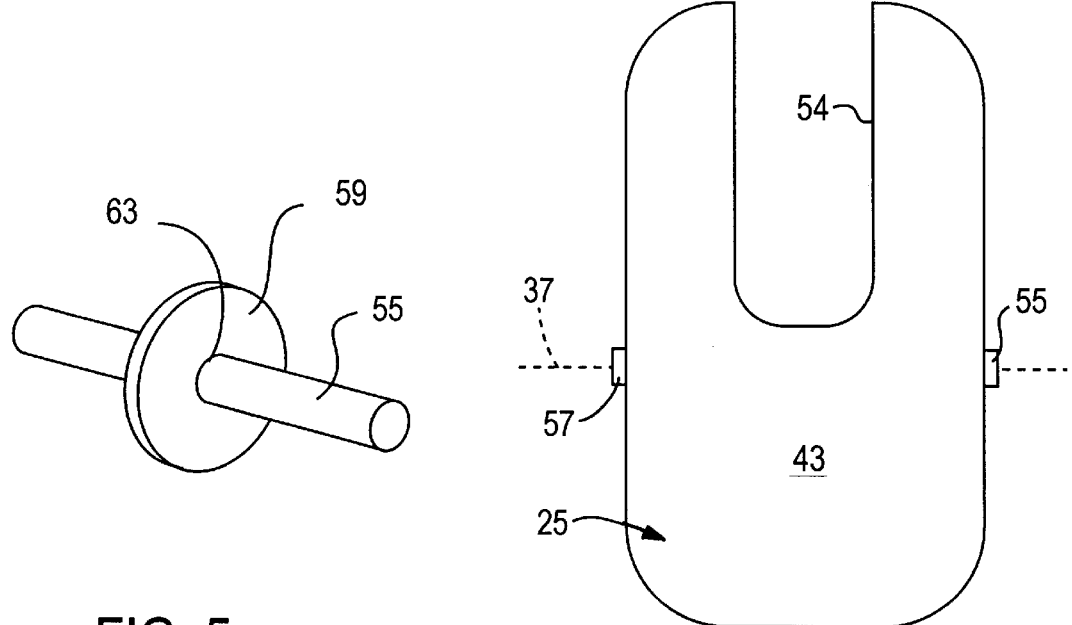
FIG. 5
FIG. 2

RECIPROCATING SAW WITH PIVOTED SHOE AND METHOD FOR ATTACHING SHOE

FIELD OF THE INVENTION

The present invention is directed to a reciprocating saw and more particularly to an improved pivoted shoe for such a saw. Additionally, the invention relates to an improved hinge for connecting two members. The hinge would be applicable to a wide variety of applications.

BACKGROUND OF THE INVENTION

Some prior art inline reciprocating saw have a shoe pivotally attached at the front end adjacent to the blade. The shoe is engaged with the workpiece during cutting to aid in guiding the movement of the saw relative to the workpiece. To permit the angle of the blade to be varied from 90° during cutting, the shoe is pivotally attached to the saw body. Typically, the shoe is attached to the body through a hinge. The hinge is formed by a pair of tabs forwardly extending from the saw body and a pair of tabs rearwardly extending from the shoe. Conventional techniques for forming a durable hinge pivot such as a pin(s) or rivet(s) extending through apertures in the tabs have proven to be unreliable and/or expensive. For example, the hinge pivot may be formed by a pin(s) welded in the shoe tab apertures. In use the welded connection can be broken when the hinge is twisted and a force transverse to the pin is applied. The welded pin forms a lever arm thereby magnifying the transverse force and increasing the risk of breaking the connection. While it is possible to form a weld that would be durable under such loads, the cost of manufacture and assembly time are excessive.

Alternatively if a rivet is used to form the hinge pivot, the rivet is subject to failure due to fatigue. Thus riveting has not proven to be an acceptable technique.

Accordingly it is desirable to develop a more reliable, low cost hinge for attaching the shoe to a reciprocating saw.

SUMMARY OF THE INVENTION

The present invention has multiple aspects. According to a first aspect, a reciprocating saw comprises a support fixed to the front end of the saw body. The support has first and second spaced tabs extending from the front end of the body. First and second apertures are formed, respectively, in the first and second tabs and are axially aligned to define a pivot axis. A shoe is connected to the support for pivotal movement about the pivot axis. The shoe has a front wall for engaging a workpiece. Third and fourth spaced tabs extend rearwardly from the front wall. Third and fourth apertures are formed, respectively, in the third and fourth tabs and are axially aligned with the first and second apertures along the pivot axis. A first pin extends through and is pivotally supported in the first and third apertures. A second pin extends through and is pivotally supported in the second and fourth apertures. A first spacer is press fitted on the first pin and located between the first and third tabs. A second spacer is press fitted on the second pin and located between the second and fourth tabs.

Preferably the shoe has a central opening in the front wall for receiving a saw blade. The first and second tabs are preferably formed in a rearwardly extending peripheral sidewall of the shoe. The first and second spacers may be annular.

According to a second aspect of the invention, a hinge for pivotally attaching two members together comprises first and second spaced tabs projecting from a first member. Third and fourth spaced tabs project from a second member and are paired, respectively, with the first and third tabs. First, second, third and fourth apertures are formed respectively in the first, second, third and fourth tabs and are axially aligned to define a pivot axis for the two members. A first pin extends through and is pivotally supported in the first and third apertures. A second pin extends through and is pivotally supported in the second and fourth apertures. A first spacer is press fitted on the first pin and is located between the first and third tabs. A second spacer is press fitted on the second pin and is located between the second and fourth tabs.

According to a third aspect of the present invention, a method for attaching a shoe to a reciprocating saw comprises the following steps. First the support is formed having first and second, spaced, tabs with axially aligned first and second apertures, respectively. Secondly, the shoe is formed having the third and fourth spaced tabs with third and fourth axially aligned apertures. Third, either the shoe tabs or the support tabs are located inwardly of the other with the apertures of the shoe tabs and support tabs in axial alignment. Preferably, the support tabs are located inwardly of the shoe tabs. Fourth, a first spacer with a central opening is located between the first and third tabs. Fifth, a second spacer with a central opening is located between the third and fourth tabs. The third, fourth and fifth steps may be performed in any order. Sixth, all of the apertures and openings of the support tabs, shoe tabs and spacers are axially aligned. Seventh, the a pin is then press fitted through the first spacer opening with the first pin extending through the first and second apertures. Eighth, a second pin is then press fitted through the second spacer opening with the second pin extending through the third and fourth apertures.

BRIEF DESCRIPTION OF THE DRAWINGS

The accompanying drawings which are incorporated in, and constitute a part of, this specification illustrate one embodiment of the invention and together with the description serve to explain the principles of the invention.

FIG. 1 is a side elevational view of a reciprocating saw with a pivoted shoe in accordance with a preferred embodiment of the invention.

FIG. 2 is a front elevational view, taken along line 2—2 of FIG. 4, of the pivoted shoe and support removed from the saw shown in FIG. 1.

FIG. 5 is an enlarged, perspective view of a pin and spacer used to form a hinge pivot for the pivoted shoe shown in FIGS. 2.

DESCRIPTION OF THE PREFERRED EMBODIMENT

Figure 3:
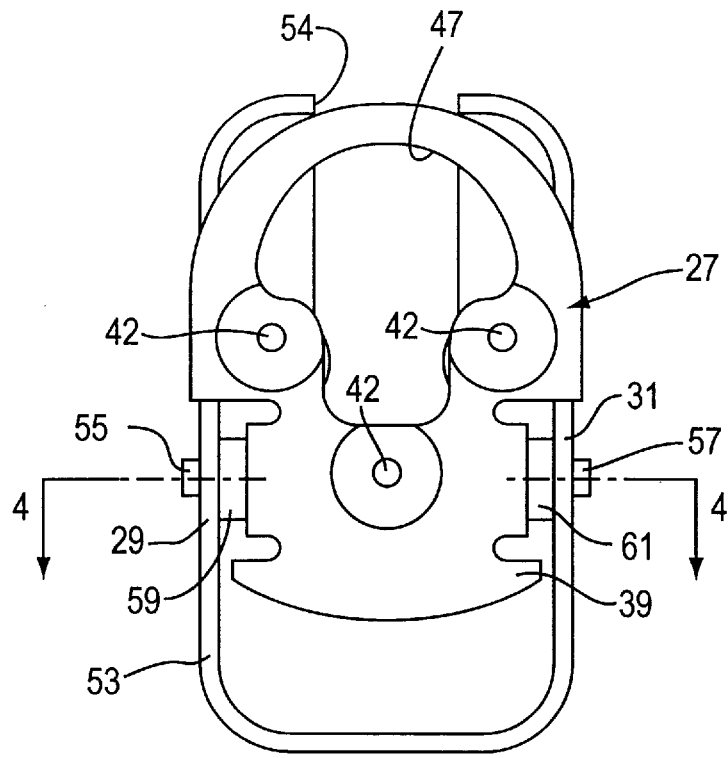
FIG. 3 is a rear elevational view, taken along line 3—3 of FIG. 4, of the pivoted shoe and support shown in FIG. 2.

The preferred embodiment of the present invention is directed to a reciprocation saw 11 with a pivoted shoe 25 as depicted in FIGS. 1–5. Also the present invention is directed to a hinge for an application such as for pivotally attaching a shoe 25 of a reciprocating saw. The hinge may be used in a variety of other applications requiring a low cost, loose fitting pivoted connection of two components. Other examples in the power tool field are attachment of the shoe in a jigsaw or circular saw. Lastly, a preferred embodiment of the present invention is directed to a method for attaching a shoe to a reciprocating saw. Such a method would be applicable particularly to other power tools such as a jigsaw and circular saw. Other applications for the invention will be apparent to those skilled in the art.

According to the preferred embodiment of the present invention as shown in FIG. 1, a reciprocating saw 11 comprises an elongated body 13 having a front end 15 and a rear end 19. Preferably, the saw 11 has a handle 17 at the rear end 19 and a main body 21 terminating in the front end 15. A blade 23 extends fowardly from the front end 15 of the saw 11. The saw 11 other than the pivoted shoe 25 may be conventional in construction.

Figure 4:
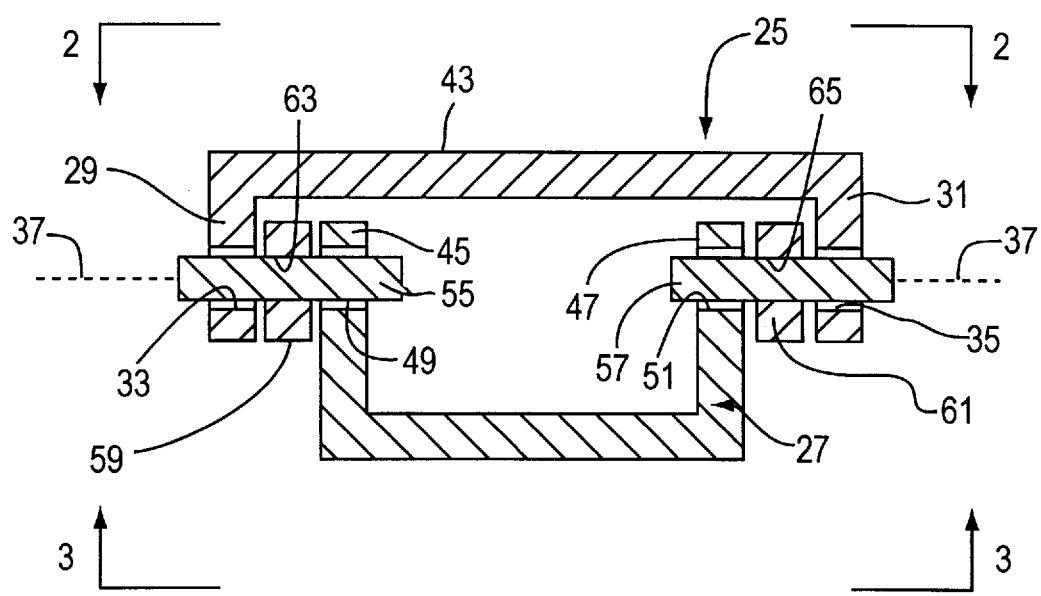
FIG. 4 is an enlarged, cross sectional view of the shoe and support taken along line 4—4 of FIG. 3.

According to the present invention as shown in FIGS. 3,4, the saw 11 comprises a support 27 fixed to the front end 15 of body 13. The support 27 has first and second spaced tabs 45,47 extending from the front end 15 of the body 13. First and second apertures 49,51 are formed respectively in the first and second tabs 45,47 and are axially aligned to define a pivot axis 37. Preferably, the support 27 has a plate 39 with a central opening 41 for receiving the blade 23 and with a plurality of screw holes 42 for attachment of the support 27 to the main body 21 of the saw 11. The tabs 45,47 are formed integrally with the plate 39 and are fowardly bent at a right angle from the sides of the plate 39.

According to the present invention as shown in FIGS. 2–4, the saw 11 further comprises a shoe 25 connected to the support 27 for pivotal movement about the pivot axis 37. The shoe 25 comprises a front wall 43 for engaging a workpiece. A third and fourth spaced tabs 29,31 extend from the front wall 43 toward the support tabs 45,47. A third and fourth apertures 33,35 are formed respectively in the third and fourth tabs 29,31 and are axially aligned with the first and second apertures 49,51 along the pivot axis 37. Preferably, front wall 43 pivots through an angular range of ±15° from an orientation generally perpendicular to the longitudinal axis of the saw 11 as shown in FIG. 1. A rearwardly extending sidewall 53 preferably extends around the periphery of the front wall 43. The third and fourth tabs 29,31 are formed in the sidewall 53 of the shoe 25 and are located outwardly of the support tabs 45,47 to form a smooth outer side surface extending from the front wall 43 of the shoe 25. Alternatively, the shoe tabs 29,31 could be located inwardly of the support tabs 45,47. A central opening 54 is formed in the front wall 43 for receiving the saw blade 23.

According the present invention as shown best in FIGS. 3–5, the saw 11 further comprises a first and second pins 55,57 and first and second spacers 59,61. The first pin 55 extends through and is pivotally supported in the first and third apertures 33,49. The second pin 57 extends through and is pivotally supported in the second and fourth apertures 35,51. The first spacer 59 is press fitted to the first pin 55 and located between the first and third tabs 45,29. The second spacer 61 is press fitted to the second pin 57 and located between the second and fourth tabs 47,31. Preferably, the pins 55,57 may have a diameter of 0.1874 INCHES and be made of high carbon chrome steel. Preferably, the spacers 59,61 may have a central opening 63,65 with a diameter of 0.1846 INCHES and be made of high strength low alloy steel. The diameters of the apertures 49,51 in the support 27 and shoe tabs 29,31 may be 0.193 INCHES. Thus the pins 55,57 will pass easily through the apertures 33,35,49,51 in the tabs but must be forced through the spacer openings 63,65 by deforming of the pins 55,57 and spacers 59,61. When press fitted in the spacers 59,61 the pins 55,57 and spacers 59,61 become rigidly fixed together and thus the shoe 25 is permanently hinged to the support 27 at two spaced locations.

The spacers 59,61 preferably are annular to permit the pins 55,57 to turn freely with the shoe 25 without engaging the rear wall of the shoe 25. Other peripheral shapes can be used as it is not necessary that pins 55,57 pivot with the shoe 25.

Another aspect of the present invention is directed to a method for attaching the shoe 25 to a power tool here explained for the reciprocating saw 11 shown in FIGS. 1–5. A preferred embodiment of the method comprises the following steps.

1. The support 27 is formed having first and second, spaced tabs 45,47 with axially aligned first and second apertures 49,51, respectively in the first and second support tabs 45,47.
2. The shoe 25 is formed having the third and fourth, spaced tabs 29,31 with third and fourth axially aligned apertures 33,35 in the third and fourth shoe tabs 29,31.
3. Either the shoe tabs 29,31 or the support tabs 45,47 are located inwardly of the other pair of tabs with the apertures 33,35,49,51 of the shoe tabs 29,31 and support tabs 45,47 in axial alignment. Preferably, the support tabs 45,47 are located inwardly of the shoe tabs 29,31.
4. The first spacer 59 with central opening 63 is located between the first and third tabs 45,29.
5. The second spacer 61 with central opening 65 is located between the second and fourth tabs 47,31. The third, fourth and fifth steps may be performed in any order. For example, the spacers 59,61 may be located adjacent to the support tabs 45,47 prior to locating the shoe 25 adjacent to the spacers 59,61 and support 27. Preferably the support 27 is mounted in a mandrel (not shown). The spacers 59,61 are next located adjacent to the support tabs 45,47 and then the shoe 25 is located in the mandrel with the shoe tabs 29,31 adjacent to the spacers 59,61.
6. All of the apertures 33,35,49,51 and openings 63,65 of the shoe tabs 29,31, support tabs 45,47 and spacers 59,61 are axially aligned. Preferably, the apertures 33,35,49,51 and openings are aligned by placing the support 27, spacers 59,61 and shoe 25 in the mandrel.
7. The first pin 55 is then press fitted through the first spacer opening 63 with the first pin 55 extending through the third and first apertures 33,49. The press fitting is preferably performed by a hydraulic ram.
8. The second pin 57 is then press fitted through the second spacer opening 65 with the second pin 57 extending through the second and fourth apertures 51,35. The pins 55,57 in the seventh and eighth steps can be inserted either sequentially or simultaneously.

The present invention provides significant advantages compared to conventional riveted hinges and welded hinges described above. The press fitted hinge provides a durable low cost hinge replacing reliance on riveting or welding. The riveted hinge has not proved to be durable. The welded hinge is more labor intensive and therefore higher in cost than the press fitted hinge. Secondly the press fitted hinge has increased the reliability because the forces on the hinge during use do not tend to apply stress to the press fitted connection of the spacer and the pin. Because the pin 55,57 is loosely fitted in the apertures 33,35,49,51 in the shoe 25 and support 27, the pin 55,57 may move transverse to the pin axis in the apertures 33,35,49,51 without damaging the integrity of the hinge. Thus there is in general no tendency for the press fitted connection to break. Also, the pivot pin 55,57 can be formed of high strength material that is more durable than a rivet.

Various modifications and variations can be made in a saw according to the present invention without departing from the scope or spirit of the invention. Thus, the present invention is intended to cover these modifications and variations provided they come within the scope of the appending claims and their equivalents.

I claim:

1. A reciprocating saw comprising:

an elongated body having a front end and a rear end;

a shoe, comprising:
- a front wall for engaging a workpiece;
- a first and second spaced tabs extending from the front wall; and
- first and second apertures formed, respectively, in the first and second tabs and axially aligned to define a pivot axis;

a support, fixed to the front end of the body, comprising:
- a third and fourth spaced tabs joined with the support and extending away from the front end of the body; and
- a third and fourth apertures formed, respectively, in the third and fourth tabs and axially aligned with the first and second apertures along the pivot axis;

the shoe connected to the support for pivotal movement about the pivot axis;

the tabs of one of the shoe and support located inwardly of the tabs of the other;

a first pin extending through and pivotally supported in the first and third apertures;

a second pin extending through and pivotally supported in the second and fourth apertures;

a first spacer press fitted on the first pin and located between the first and third tabs; and a second spacer press fitted on the second pin and located between the second and fourth tabs.

2. The saw of claim 1 wherein the shoe comprises:

a central opening in the front wall for receiving a saw blade and a sidewall extending rearwardly from the periphery of the front wall and having the first and second tabs formed in the sidewall of the shoe.

3. The saw of claim 1 wherein the first and second spacers are annular.

4. The saw of claim 1 wherein the tabs of the support are located inwardly of the tabs of the shoe.

5. A hinge for pivotally attaching two members together comprising:

first and second spaced tabs projecting from a first member;

third and fourth spaced tabs projecting from a second member and paired, respectively, with the first and second tabs;

a first, second, third and fourth apertures formed respectively in the first, second, third and fourth tabs and axially aligned to define a pivot axis for the two members;

the tabs of the first and second members located inwardly of the tabs of the other member;

a first pin extending through and pivotally supported in the first and third apertures;

a second pin extending through and pivotally supported in the second and fourth apertures;

a first spacer press fitted on the first pin and located between the first and third tabs; and a second spacer press fitted on the second pin and located between the second and fourth tabs.

6. The hinge of claim 5 wherein the first and second spacers are annular.

7. The hinge of claim 5 wherein:

the first member is a shoe support and the second member is a shoe for a reciprocating saw; and the tabs of the shoe support are located inwardly of the tabs of the shoe.

8. A method for attaching a shoe to a reciprocating saw comprising:

forming a support having a first and second, spaced, tabs with an axially aligned first and second apertures, respectively, in the first and second support tabs;

forming a shoe with third and fourth, spaced tabs with third and fourth axially aligned apertures in the third and fourth shoe tabs;

locating either the shoe tabs or the support tabs inwardly of the other with the apertures of the shoe tabs and support tabs in axial alignment;

locating a first spacer with a central opening between the first and third tabs;

locating a second spacer with a central opening between the second and the fourth tabs;

axially aligning all of the apertures and openings of the support tabs, shoe tabs and spacers;

press fitting a first pin through the first spacer opening with the first pin extending through the first and third apertures; and press fitting a second pin through the second spacer opening with the second pin extending through the second and fourth apertures.

* * * * *